(12) United States Patent
Donald et al.

(10) Patent No.: US 11,702,910 B2
(45) Date of Patent: Jul. 18, 2023

(54) JUMPER TERMINATION APPARATUS FOR A SUBSEA JUMPER FLOWLINE AND A METHOD OF CONNECTING SUBSEA FLOWLINES TO A SUBSEA MANIFOLD

(71) Applicant: Enpro Subsea Limited, Aberdeen (GB)

(72) Inventors: Ian Donald, Inverurie (GB); John Reid, Perthshire (GB); Craig McDonald, Aberdeen (GB)

(73) Assignee: Enpro Subsea Limited, Aberdeen (GB)

( * ) Notice: Subject to any disclaimer, the term of this patent is extended or adjusted under 35 U.S.C. 154(b) by 0 days.

(21) Appl. No.: 16/977,417

(22) PCT Filed: Mar. 13, 2019

(86) PCT No.: PCT/GB2019/050711
§ 371 (c)(1),
(2) Date: Sep. 1, 2020

(87) PCT Pub. No.: WO2019/175585
PCT Pub. Date: Sep. 19, 2019

(65) Prior Publication Data
US 2021/0002986 A1 Jan. 7, 2021

(30) Foreign Application Priority Data
Mar. 13, 2018 (GB) ..................... 1804007

(51) Int. Cl.
*E21B 43/01* (2006.01)
*F16L 1/26* (2006.01)
*E21B 43/017* (2006.01)

(52) U.S. Cl.
CPC ............ *E21B 43/0107* (2013.01); *F16L 1/26* (2013.01); *E21B 43/017* (2013.01)

(58) Field of Classification Search
CPC .. E21B 43/0107; E21B 43/017; E21B 43/013; F16L 1/26
See application file for complete search history.

(56) References Cited

U.S. PATENT DOCUMENTS 9,784,074 B1 * 10/2017 Heliums ............. E21B 41/0007
2003/0145997 A1 * 8/2003 Langford ........... B01D 17/0208
166/350

(Continued)

FOREIGN PATENT DOCUMENTS

WO 2018045357 A1 3/2018
WO 2019096445 A1 5/2019

*Primary Examiner* — Sean D Andrish
(74) *Attorney, Agent, or Firm* — Holzer Patel Drennan

(57) ABSTRACT

The invention provides a jumper termination apparatus for a subsea jumper flowline, a flow system incorporating a jumper termination apparatus, and a method of use. The jumper termination apparatus comprises a body, a jumper coupling means configured to couple the body to a jumper flowline, a connector coupling means configured to couple the body to a subsea manifold connector, and an access interface disposed on the body, arranged above the connector coupling means and vertically oriented to enable access from above. The body defines a first flow path from a coupled jumper flowline to a coupled subsea manifold connector, and a second flow path from the access interface to the first flow path or the subsea manifold connector. The access interface is configured to be connected to a termination apparatus of a second jumper flowline in a vertically stacked arrangement.

24 Claims, 5 Drawing Sheets

(56) References Cited

U.S. PATENT DOCUMENTS

2005/0070150 A1    3/2005   Williams
2007/0044972 A1*   3/2007   Roveri ................ E21B 43/0107
                                                              166/367

* cited by examiner

JUMPER TERMINATION APPARATUS FOR A SUBSEA JUMPER FLOWLINE AND A METHOD OF CONNECTING SUBSEA FLOWLINES TO A SUBSEA MANIFOLD

The present invention relates to apparatus, systems and methods for oil and gas operations. In particular, the present invention relates to apparatus, systems and methods for connecting subsea flowlines to a subsea manifold. Aspects of the invention also have application to fluid and mechanical intervention in subsea oil and gas production and injection infrastructure

BACKGROUND TO THE INVENTION

In the field of subsea engineering for the hydrocarbon production industry, it is known to provide flow systems comprising a subsea manifold connected to several flowlines from or to other flow infrastructure, for example from or to subsea wells. A typical subsea manifold has a plurality of spatially distributed connectors for tie-in of the flowlines, which may be jumper flowlines. During the development of subsea hydrocarbon fields, it is often the case that new hydrocarbon discoveries are made and/or further tie-ins to the flow system infrastructure are required. If an existing subsea manifold has no connectors available, new subsea infrastructure may need to be installed to enable the new well to be tied-in and to accommodate any further tie-ins which may be required in the future.

SUMMARY OF THE INVENTION

There is generally a need for a method and apparatus which addresses one or more of the problems identified above.

It is amongst the aims and objects of the invention to provide a method and/or apparatus for connecting subsea flowlines to a subsea manifold, which obviates or mitigates one or more drawbacks or disadvantages of the prior art.

Other aims and objects will become apparent from the following description.

According to a first aspect of the invention, there is provided a method of connecting subsea flowlines to a subsea manifold, the method comprising:

providing a first jumper flowline having a first jumper termination apparatus connected to a first subsea manifold connector and comprising a first access interface;

providing a second jumper flowline having a second jumper termination apparatus; and connecting the second jumper flowline to the subsea manifold via the access interface and the first subsea manifold connector.

The method may comprise stacking the second jumper termination apparatus on the first jumper termination apparatus. The method may comprise vertically stacking the second jumper termination apparatus on the first jumper termination apparatus.

The second jumper termination apparatus may comprise a second access interface, and the method may comprise:

providing a further jumper flowline having a further jumper termination apparatus; and connecting the further jumper flowline to the subsea manifold via the second access interface, the first jumper termination apparatus, and the first subsea manifold connector.

The further jumper termination apparatus may comprise a further access interface.

The method may also comprise connecting the first jumper termination apparatus to the first subsea manifold connector, for example by an ROV (Remotely Operated Vehicle)—operated clamping action.

The method may comprise clamping the second jumper termination apparatus to the first subsea manifold connector.

The second jumper termination apparatus may comprise a guide funnel. The method may comprise orienting a cut-away or relief of the guide funnel to accommodate the first jumper flowline.

The further jumper termination apparatus may comprise a guide funnel. The method may comprise orienting a cut-away or relief of the guide funnel to accommodate the second jumper flowline.

The method may comprise performing fluid intervention or mechanical intervention operations on the flow system via the first access interface, and/or the second access interface and/or the further access interface. Fluid intervention operations may be a fluid intervention operation from the group comprising: fluid sampling, fluid pumping, fluid diversion, fluid recovery, fluid injection, fluid circulation, fluid measurement fluid metering, artificial/gas lift, and/or well scale squeeze operations. Mechanical intervention operations may be cleaning and/or pigging operations.

According to a second aspect of the invention, there is provided a jumper termination apparatus for a subsea jumper flowline, the jumper termination apparatus comprising:

a body;

a jumper coupling means configured to couple the body to a jumper flowline;

a connector coupling means configured to couple the body to a subsea manifold connector;

and an access interface disposed on the body;

wherein the body defines a first flow path from a coupled jumper flowline to a coupled subsea manifold connector, and a second flow path from the access interface to the first flow path and/or the subsea manifold connector;

and wherein the access interface is configured to be connected to a second jumper flowline.

The access interface may be vertically oriented, which may enable access from above.

The access interface may be oriented on an axis inclined to the main axis of the manifold connector, for example in a radial plane.

Alternatively, the access interface may have an axis of orientation which may be horizontal, or which may be inclined at an angle to the horizontal.

The second flow path may be inclined at an angle to the immediately adjacent portion of the jumper flowline.

The jumper flowline may comprise a composite jumper flowline.

The jumper coupling means may comprise a studded connection.

The jumper coupling means may comprise a curved gooseneck section which may be configured to be disposed between the body and the jumper flowline. The gooseneck section may be connected to the body and the jumper flowline by flanged connections.

The access interface may be configured to provide access for a fluid intervention or mechanical intervention operation on the flow system. Fluid intervention operations may be a fluid intervention operation from the group comprising: fluid sampling, fluid pumping, fluid diversion, fluid recovery, fluid injection, fluid circulation, fluid measurement fluid metering, artificial/gas lift, and/or well scale squeeze operations. Mechanical intervention operations may be cleaning and/or pigging operations.

In this context, connected means a physical interaction between two components. The connection may be directly or via an intermediate component. The access interface may be configured to be connected to a second jumper flowline directly. Alternatively, or in addition, the access interface may be configured to be connected to a second jumper flowline via a jumper termination apparatus of the second jumper flowline.

Embodiments of the second aspect of the invention may include one or more features of the first aspect of the invention or its embodiments, or vice versa.

According to a third aspect of the invention, there is provided a jumper termination apparatus for a subsea jumper flowline, the jumper termination apparatus comprising:

a body;

a jumper coupling means configured to couple the body to a jumper flowline;

an interface coupling means configured to couple the body to an access interface of a jumper flowline termination head of a further jumper flowline.

The jumper termination apparatus may comprise a guide funnel, and/or may comprise a cut-away or relief configured to accommodate the further jumper flowline. The cut-away or relief may be in the guide funnel.

The jumper termination apparatus may comprise a further access interface, which may be configured for connection of a jumper termination apparatus. The further access interface may be configured to provide access for a fluid intervention or mechanical intervention operation on the flow system.

Embodiments of the third aspect of the invention may include one or more features of the first or second aspects of the invention or their embodiments, or vice versa.

According to a fourth aspect of the invention, there is provided a flow system for a subsea hydrocarbon production or injection installation, the flow system comprising:

a subsea manifold;

a first jumper flowline having a first jumper termination apparatus connected to a first subsea manifold connector and comprising a body and a first access interface;

wherein the body defines a first flow path from the first jumper flowline to the subsea manifold connector, and a second flow path from the access interface to the first flow path and/or the subsea manifold connector;

and wherein the first access interface is configured to be connected to a second jumper flowline.

The subsea manifold may be a collection manifold.

The first subsea manifold connector may be a male connector.

The first jumper termination apparatus may comprise a connector coupling means for connecting the first jumper termination apparatus to the first subsea manifold connector. The connector coupling means may be a female connector.

The flow system may comprise a second jumper flowline having a second jumper termination apparatus, wherein the second jumper flowline is connected to the subsea manifold via the first access interface and the subsea manifold connector.

The first and second jumper termination apparatus may be stacked. The first and second jumper termination apparatus may be vertically stacked.

The first and/or second jumper flowlines may comprise a composite jumper flowline.

The first and/or second jumper flowlines may be production jumper flowlines which may facilitate production flow from respective subsea wells into the subsea manifold.

The subsea manifold, and the first and/or second jumper flowlines may comprise multiple flow lines or flow bores.

The first and/or second jumper termination apparatus may define a further flow path or flow paths which correspond to the multiple flow lines or flow bores of the subsea manifold and the first and/or second jumper flowlines.

Embodiments of the fourth aspect of the invention may include one or more features of the first to third aspects of the invention or their embodiments, or vice versa.

According to a fifth aspect of the invention, there is provided a method of connecting subsea flowlines to a subsea manifold, the method comprising:

providing a first jumper flowline having a first jumper termination apparatus configured to be connected to a subsea manifold connector and comprising a first access interface;

providing a second jumper flowline having a second jumper termination apparatus configured to be connected to an access interface;

connecting the second jumper termination apparatus of the second jumper flowline to the first access interface of the first jumper termination apparatus; and connecting the first jumper termination apparatus of the first jumper flowline to a subsea manifold connector.

Embodiments of the fifth aspect of the invention may include one or more features of the first to fourth aspects of the invention or their embodiments, or vice versa.

BRIEF DESCRIPTION OF THE DRAWINGS

There will now be described, by way of example only, various embodiments of the invention with reference to the drawings, of which.

DETAILED DESCRIPTION OF PREFERRED EMBODIMENTS

Figure 1A:
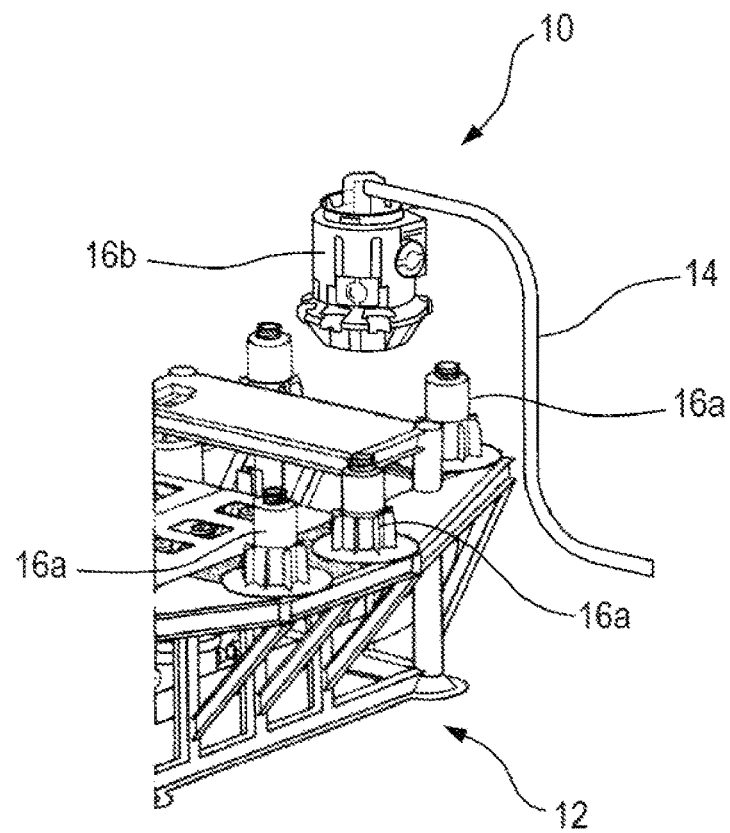
FIGS. 1A and 1B are perspective views of a prior art subsea production manifold tie-in system, respectively before and after connection of a jumper flowline.
Figure 1B:
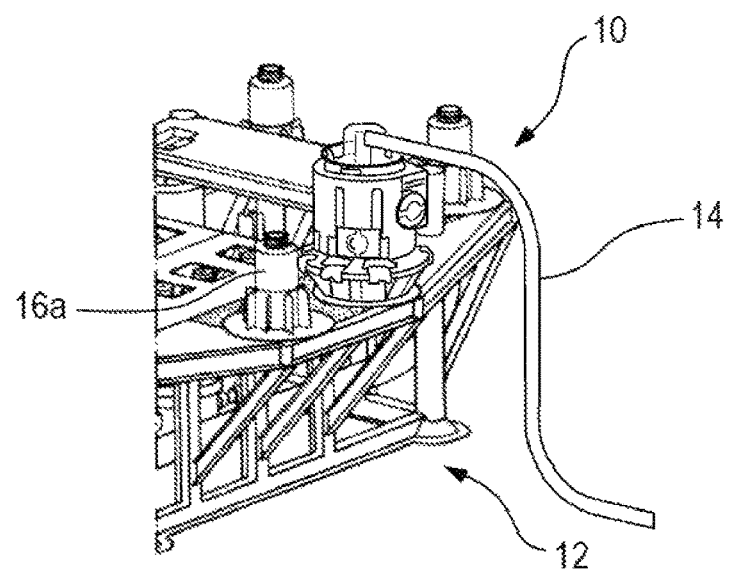

Referring firstly to FIGS. 1A and 1B, there is shown, generally at 10 a subsea production manifold tie-in system according to the prior art. The system comprises a subsea manifold 12, which in this example is a collection manifold comprising a plurality of proprietary subsea connectors 16a for the connection of production jumper flowlines 14 from respective subsea wells. The subsea connectors 16a are male connectors of a proprietary vertical tie-in connection system, of which there are several types in the industry, and the jumper flowlines 14 are terminated with a jumper termination head comprising a corresponding female proprietary connector 16b. In this embodiment, the flowline being tied-in is a vertically-deployed jumper flowline 14. FIG. 1A shows the system prior to the connection being made-up, and FIG. 1B shows the connection made up such that production flow from the jumper flowline can enter the manifold for onward processing, production, or transportation.

The manifold 12 also comprises a number of other connectors 16a, each available to be connected to connectors on additional jumper flowlines from other subsea wells. Subsea manifolds of this type can therefore accommodate a number of jumper flowlines, determined by the number of connectors on the manifold. However, during the development of subsea hydrocarbon fields, it is often the case that new hydrocarbon discoveries are made and/or further tie-ins to the production infrastructure are required. If an existing subsea production manifold has no connectors available, new subsea infrastructure must be installed to enable the new well to be tied-back and to accommodate any further tie-ins which may be required in the future.

Figure 2A:
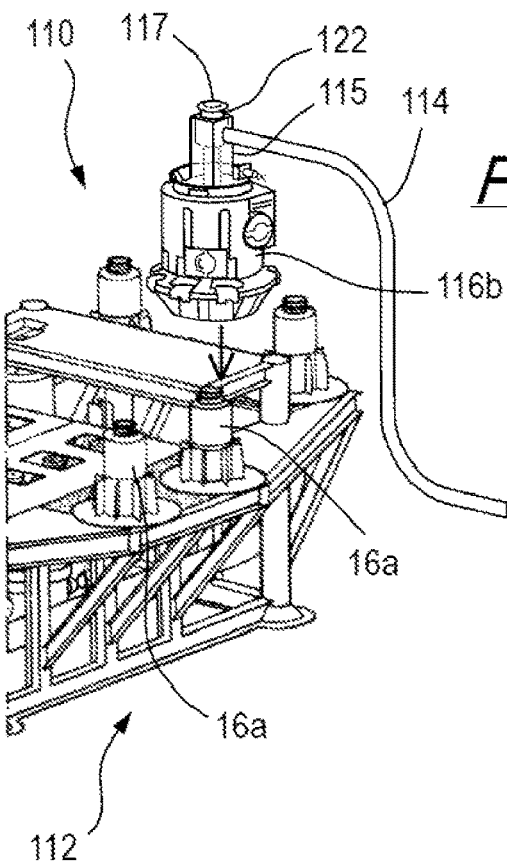
FIGS. 2A to 2C are perspective views of a subsea production manifold tie-in system according to an embodiment of the invention, in various conditions.
Figure 2B:
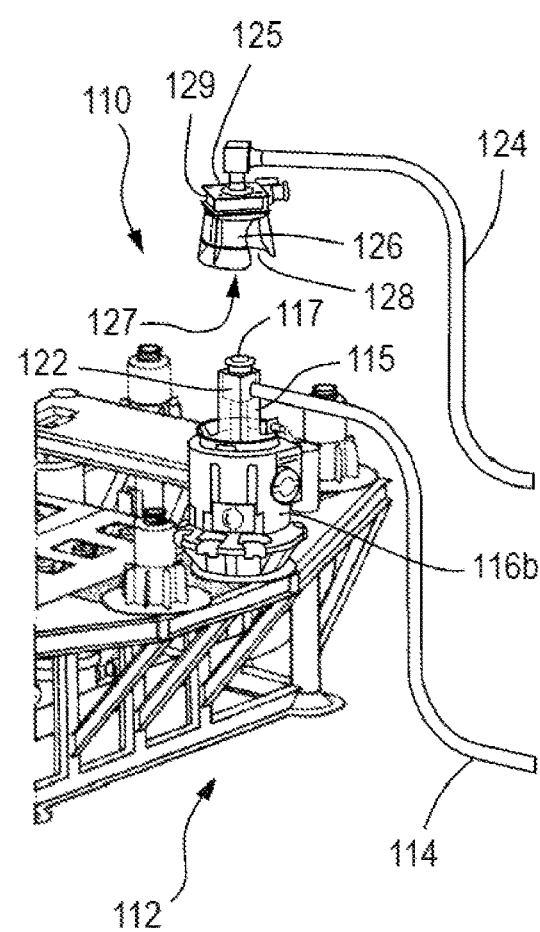
Figure 2C:
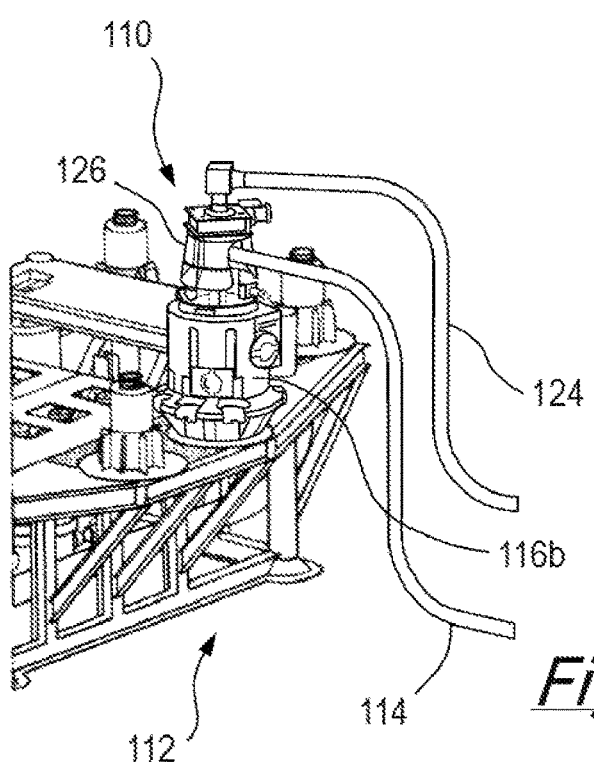

Referring now to FIGS. 2A, 2B and 2C, a subsea production manifold tie-in system according to an embodiment of the invention is shown generally at 110. The manifold 112 is the same as the manifold 12 of FIGS. 1A and 1B, and comprises a number of connectors 16a for connection of jumper flowlines. However, the connection system between the jumper flowlines and the manifold is modified to provide additional flexibility of operation and/or increased connection capability, as will be described below.

In this embodiment of the invention, the jumper flowline is terminated in a modified connector assembly 115, comprising female connector 116b and access interface 122. The female connector 116b is similar to the connector 16b, and enables the jumper flowline 114 and the manifold to be fluidly coupled to a manifold connector 16a. The access interface 122 comprises an additional access bore 117 which enables fluid and/or mechanical access to the inlet bore of the connector 16a, even after make-up with the jumper flowline 114. The access bore is at an angle to the immediately adjacent portion of the jumper flowline, and in this embodiment is vertically oriented to enable access from above.

FIG. 2B shows the connection between the jumper flowline 114 and the manifold after it is made up, by engagement of the connector 16a and the connector 116b. The system 110 also includes a second jumper flowline 124, terminated in a termination head 125 comprising a connector portion 126 configured for connection to the access bore 117 of the access interface 122. The connector portion 126 comprises a guide funnel 127 comprising a cut out profile 128, such that the guide funnel can be placed over the access interface 122 with the cut-out profile accommodating the installed jumper flowline 114.

Internal to the guide funnel is a bore connection which enables the jumper flowline to be placed in fluid communication with the access bore 117. An external clamp mechanism 129, operable by an ROV, enables the connection to be made up as shown in FIG. 2C.

The system 110 therefore comprises a dual jumper connection to a single manifold connector 16a, with the jumper terminations connected to the manifold in a vertically stacked arrangement. The system therefore increases the number of jumper flowlines that may be connected to the manifold, and/or alternatively provides flexible connection locations for jumper flowlines on the manifold. Such a configuration increases the connection capacity of existing subsea flow systems, reducing the requirement for additional subsea infrastructure.

The foregoing embodiment shows the vertically-stacked connection of a pair of vertically-deployed conventional steel jumper flowlines onto a single proprietary connector on a subsea manifold. However, it would be appreciated that alternative configurations of jumper system may be used within the scope of the invention. For example, the access interface may be oriented on an axis inclined to the main axis of the manifold connector, for example in a radial plane. The principles of the invention may be applied to horizontal manifold connectors or inclined manifold connectors, and/or the access interface may have an axis of orientation which is vertical, horizontal, or inclined.

Alternative embodiments of the invention may use alternative materials for the jumper system, and/or alternative geometries or configurations of the connection system in order to facilitate the connection of two jumper flowlines to a single manifold connector.

Figure 3:
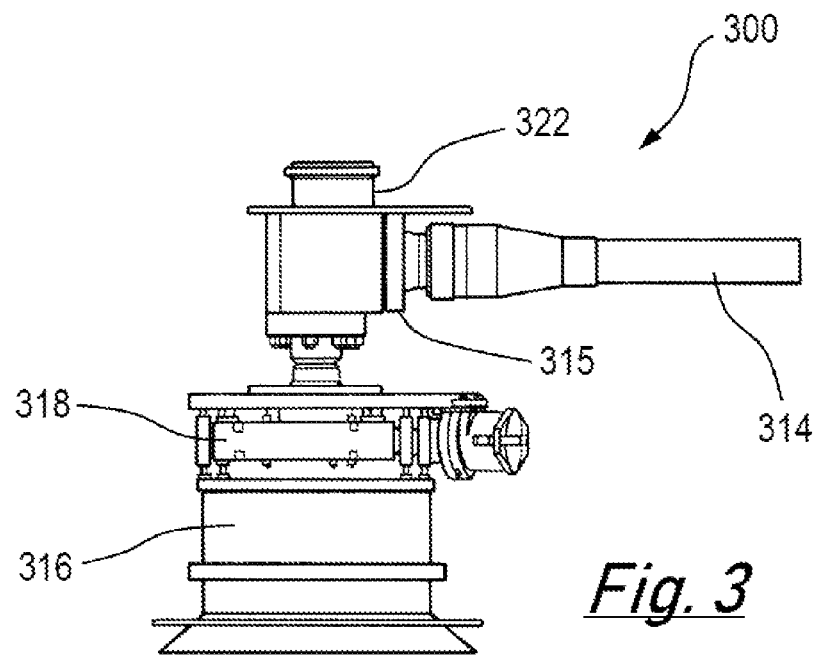
FIG. 3 is a side view of a jumper flowline termination according to an alternative embodiment of the invention.

FIG. 3 is an example of a jumper connection systems, generally depicted at 300, having a jumper termination head and jumper arrangement, where the jumper flowline 314 is a composite jumper flowline provided with a studded inlet connection 315 to a body supporting the access interface 322. As with previous embodiments, the access interface 322 is arranged above a female connector 316 with an external clamp 318, and is designed to connect onto a corresponding proprietary connector of the manifold. By using a composite material for the jumper flowline 314, the overall weight of the jumper flowline and connector system may be reduced, compared to the weight of a conventional steel jumper flowline. This reduces the static load on the connector and manifold. In addition, the increased flexibility of the composite jumper flowline compared with the conventional steel jumper flowline may reduce the dynamic load on the connector and manifold.

Figure 4:
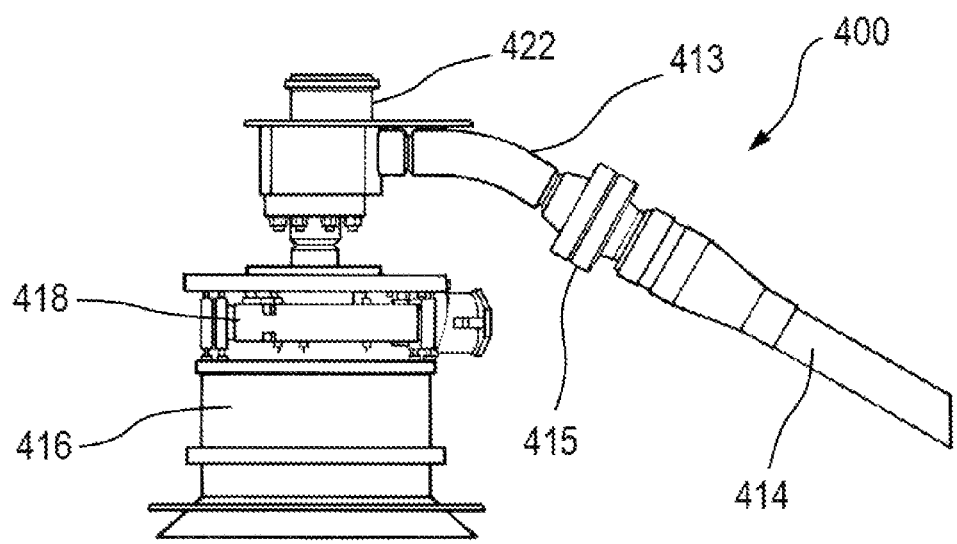
FIG. 4 is a side view of a jumper flowline termination according to a further alternative embodiment of the invention.

FIG. 4 is a side view of a further alternative embodiment of the invention. In this embodiment, the connector and jumper flowline system, generally shown at 400, comprises a composite jumper flowline 414 connected to a block supporting an access interface 422 above connector 416 with an external clamp 418. In this embodiment, the composite jumper flowline forms a flanged connection 415 with a rigid, curved gooseneck section 413 disposed between the block and the jumper flowline. The system 400 offers the load reduction benefits of the system 300, and the gooseneck portion may provide an improved position of the composite jumper flowline, and further reduce the static and/or dynamic loads on the connector and manifold.

The load reduction benefits described above may be significant in some applications of the invention to mitigate the effect of increased loads due to additional connectors connecting at a single point on the manifold. Alternatively, or in addition, the load reduction benefits may enable landing and/or installation of additional equipment on the manifold before its load bearing capacity is exceeded.

Figure 5:
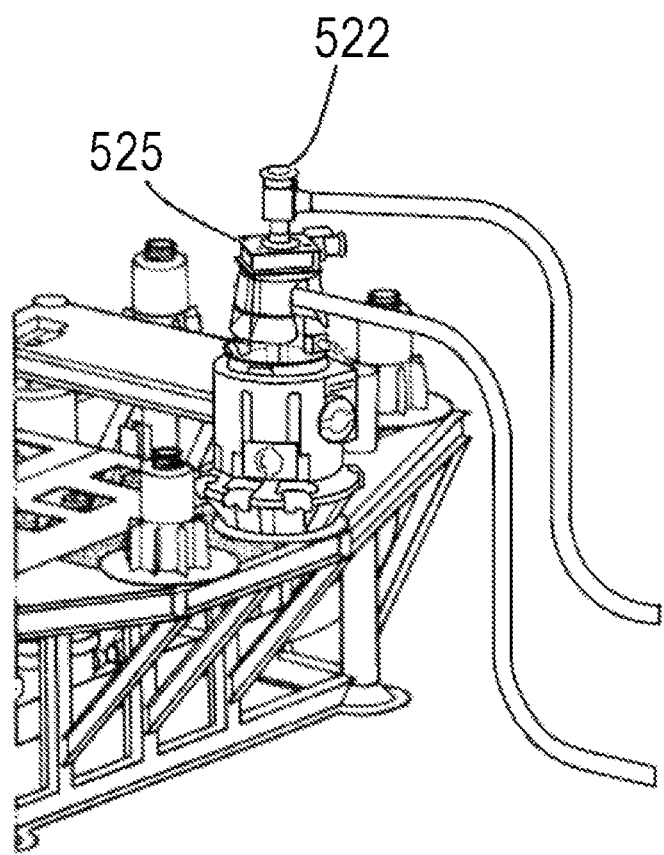
FIG. 5 is a perspective view of a jumper flowline termination according to an embodiment of the invention.

Although the foregoing embodiments show a pair of vertically stacked jumper connectors, it will be appreciated that alternative embodiments of the invention, three or more jumper flowlines may be connected onto a single manifold connector, for example by vertical stacking of third and further jumper termination heads. In an embodiment, this can be implemented by providing a second jumper termination head with a second access interface, configured for the connection of a further jumper termination head. Such an embodiment is shown in FIG. 5. The arrangement shown in FIG. 5 is similar to the arrangement shown in FIG. 2C, but differs in that the second jumper termination head 525 comprises a second (or further) access interface 522 for the connection of a further jumper termination head. Third and further jumper termination heads may be similarly configured to enable continuing connection (e.g. by stacking) of jumper flowlines on a single manifold connector. In such implementations of the invention, reducing the static or dynamic loads by the use of composite jumper flowlines and/or flowline geometries may be beneficial.

In further alternative embodiments of the invention, the access interface of a jumper termination head may be used to provide access for a fluid intervention or mechanical intervention operation. Such fluid intervention operations may be selected from (but are not limited to) fluid sampling, fluid pumping, fluid diversion, fluid recovery, fluid injection, fluid circulation, fluid measurement fluid metering, artificial/gas lift, and/or well scale squeeze operations. Mechanical intervention operations include but are not restricted to cleaning and/or pigging operations.

The jumper termination head may be a modified jumper termination head, modified to include the access interface and a flow path connecting the access interface to the subsea manifold connector or a flow path between the subsea manifold connector and the jumper flowline coupling. Alternatively, the system may be provided with an adaptor hub which is configured to be connected between the jumper flowline and the subsea manifold connector (for example between the jumper termination head and the subsea manifold connector, or between the jumper termination head), and which provides the access interface. The invention may therefore extend to a jumper termination head assembly comprising an adaptor hub and a conventional jumper termination head.

Figure 6A:
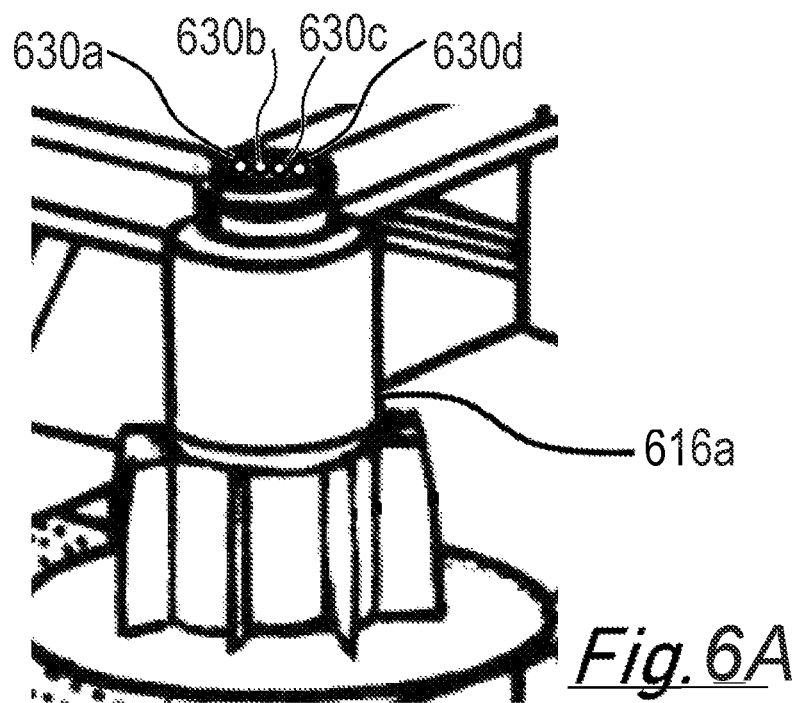
FIG. 6A is a perspective view of a manifold connector according to an embodiment of the invention.
Figure 6B:
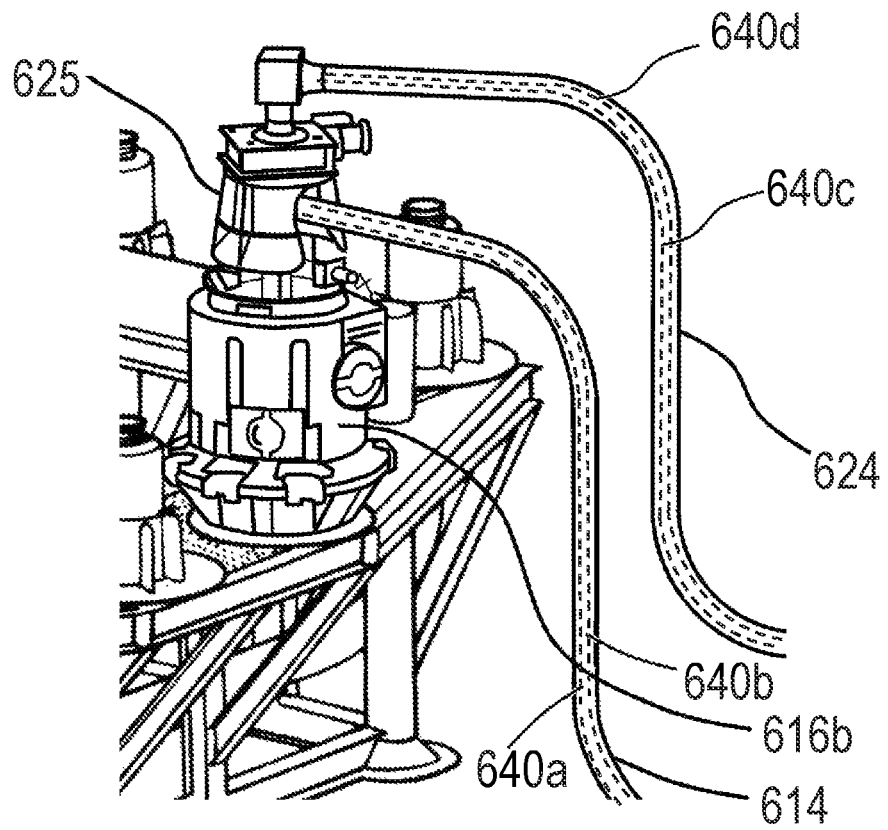
FIG. 6B is a perspective view of a subsea production manifold tie-in system according to an embodiment.

In a further alternative embodiment, the jumper termination head, or jumper termination head assembly, may comprise multiple flow lines or flow bores extending therethrough, to correspond to multiple flow lines or flow bores present in the flow system. Such an arrangement is shown in FIGS. 6A and 6B. The manifold connector 616a—shown in detail in FIG. 6A, is similar to the manifold connector 16a shown in FIGS. 2A to 2C, but differs in that it comprises four flow bores 630a, 630b, 630c and 630d. Each jumper flowline 614 and 624 comprises two flowlines (shown as dotted lines 640a, 640b, 640c and 640d). The first 616b and second 625 jumper termination heads each comprise respective flow bores to fluidly connect the flow lines 640a, 640b, 640c and 640d with the flow bores 630a, 630b, 630c and 630d of the manifold. In more specific examples, a connector on the subsea manifold may incorporate production flow lines and injection or artificial lift flow lines, and the jumper may be similarly configured. The jumper flowline connection system may comprise a set of parallel flow lines configured for connection of the respective lines between the subsea tree and the jumper, and at least one of the parallel flow lines may be provided with an access interface for another flow stream directed in or out of the flow system (e.g. production fluid being brought in from another subsea tree), or as an access interface for fluid or mechanical intervention as described above.

The invention provides a jumper termination apparatus for a subsea jumper flowline, a flow system for a subsea hydrocarbon production or injection installation incorporating such a jumper termination apparatus, and a method of use. The jumper termination apparatus comprises a body, a jumper coupling means configured to couple the body to a jumper flowline, and a connector coupling means configured to couple the body to a subsea manifold connector. An access interface is disposed on the body. The body defines a first flow path from a coupled jumper flowline to a coupled subsea manifold connector, and a second flow path from the access interface to the first flow path or the subsea manifold connector. The access interface is configured to be connected to a second jumper flowline. A flow system comprises a subsea manifold and a first jumper flowline having a first jumper termination apparatus connected to a first subsea manifold connector, and may also comprise a second jumper flowline having a second jumper termination apparatus, wherein the second jumper flowline is connected to the subsea manifold via the first access interface and the subsea manifold connector. In another aspect, the invention provides a jumper termination apparatus for a subsea jumper flowline comprising a body, a jumper coupling means configured to couple the body to a jumper flowline; and an interface coupling means configured to couple the body to an access interface of a jumper flowline termination head of a further jumper flowline.

The invention facilitates connection of multiple flowlines, for example by daisy-chaining flowlines, into flow systems with a limited number of connection locations, reducing the requirement to add subsea flow infrastructure.

Various modifications to the above-described embodiments may be made within the scope of the invention, and the invention extends to combinations of features other than those expressly recited herein.

The invention claimed is:

1. A jumper termination apparatus for a subsea jumper flowline, the jumper termination apparatus comprising:
   a body;
   a jumper coupling means configured to couple the body to a first production jumper flowline for facilitating production flow from a first subsea well into a subsea manifold, to allow the jumper termination apparatus to receive production flow from the first subsea well via the first production jumper flowline;
   a connector coupling means configured to couple the body to a subsea manifold connector of the subsea manifold; and
   an access interface disposed on the body and arranged above the connector coupling means;
   wherein the access interface is vertically oriented to enable access from above;
   wherein the body defines a first flow path from the first coupled production jumper flowline to a coupled subsea manifold connector, and a second flow path from the access interface to the first flow path or the subsea manifold connector; and
   wherein the access interface is configured to be connected to a termination apparatus of a second production jumper flowline for facilitating production flow from a second subsea well into the subsea manifold in a vertically stacked arrangement to receive production flow from the second subsea well via the second production jumper flowline.

2. The jumper termination apparatus according to claim 1, wherein the jumper coupling means comprises a gooseneck section configured to be disposed between the body and the first coupled jumper flowline.

3. The jumper termination apparatus according to claim 1, wherein the access interface provides access for fluid intervention or mechanical intervention operations on a flow system.

4. A flow system for a subsea hydrocarbon production or injection installation, the flow system comprising:
   a subsea manifold;
   a first production jumper flowline for facilitating production flow from a first subsea well into the subsea manifold, having a first jumper termination apparatus according to claim 1 connected to a subsea manifold connector of the subsea manifold and comprising a body and a first access interface;

wherein the body of the first jumper termination apparatus defines a first flow path from the first production jumper flowline to the subsea manifold connector, and a second flow path from the first access interface to the first flow path or the subsea manifold connector; and wherein the first access interface is configured to be connected to a termination apparatus of a second production jumper flowline for facilitating production flow from a second subsea well into the subsea manifold in a vertically stacked arrangement to receive production flow from the second subsea well.

5. The flow system according to claim 4, wherein the subsea manifold is a collection manifold.

6. The flow system according to claim 4, wherein the flow system comprises the second production jumper flowline for facilitating production flow from a second subsea well into the subsea manifold, having a second jumper termination apparatus, and wherein the first jumper termination apparatus and the second jumper termination apparatus are vertically stacked such that the second production jumper flowline is connected to the subsea manifold via the first access interface and the subsea manifold connector.

7. The flow system according to claim 4, wherein the first production jumper flowline and/or the second production jumper flowline comprise a composite jumper flowline.

8. The flow system according to claim 4, wherein the subsea manifold, and the first production jumper flowline and/or the second production jumper flowline comprise multiple flow lines or flow bores.

9. The flow system according to 8, wherein the first jumper termination apparatus and/or second jumper termination apparatus define a further flow path or flow paths which correspond to the multiple flow lines or flow bores of the subsea manifold and the first and/or second production jumper flowlines.

10. The flow system according to claim 4, wherein the second flow path connects the access interface to the first flow path.

11. The jumper termination apparatus according to claim 1, wherein the second flow path connects the access interface to the first flow path.

12. A jumper termination apparatus for a second subsea production jumper flowline, the jumper termination apparatus comprising:
a body;
a jumper coupling means configured to couple the body to a second production jumper flowline for facilitating production flow from a second subsea well into a subsea manifold, to allow the jumper termination apparatus for the second subsea production jumper flowline to receive production flow from the second subsea well via the second production jumper flowline; and
an interface coupling means configured to couple the body to an access interface of a jumper termination apparatus of a first production jumper flowline, in a vertically stacked arrangement on the subsea manifold to enable production fluid to flow from the second subsea well into the subsea manifold via the second production jumper flowline.

13. The jumper termination apparatus according to claim 12, comprising a guide funnel with a cut-away or relief configured to accommodate the first production jumper flowline.

14. The jumper termination apparatus according to claim 12, comprising a further access interface for connection of a further jumper termination apparatus.

15. A method of connecting subsea flowlines to a subsea manifold, the method comprising:
providing a first production jumper flowline for facilitating production flow from a first subsea well into the subsea manifold, having a first jumper termination apparatus connected to a subsea manifold connector of the subsea manifold and comprising a first access interface;
providing a second production jumper flowline for facilitating production flow from a second subsea well into the subsea manifold, the second production jumper flowline having a second jumper termination apparatus; and
connecting the second production jumper flowline to the subsea manifold via the first access interface of the first jumper termination apparatus and the subsea manifold connector by vertically stacking the second jumper termination apparatus on the first jumper termination apparatus.

16. The method according to claim 15, wherein the second jumper termination apparatus comprises a guide funnel, and wherein the method comprises orienting a cut-away or relief of the guide funnel to accommodate the first production jumper flowline.

17. The method according to claim 15, wherein the second jumper termination apparatus comprises a second access interface, and the method comprises:
providing a further production jumper flowline for facilitating production flow from a further subsea well into the subsea manifold, having a further jumper termination apparatus; and
connecting the further production jumper flowline to the subsea manifold via the second access interface of the second jumper termination apparatus, the first jumper termination apparatus, and the first subsea manifold connector.

18. The method according to claim 17, wherein the further jumper termination apparatus comprises a further access interface.

19. The method according to claim 17, wherein the further jumper termination apparatus comprises a guide funnel, and the method comprises orienting a cut-away or relief of the guide funnel to accommodate the second production jumper flowline.

20. The method according to claim 17, wherein the method comprises performing fluid intervention or mechanical intervention operations on a flow system via at least one of the first access interface, the second access interface and the further access interface.

21. The method according to claim 20, wherein the fluid intervention operations are fluid intervention operations from the group comprising: fluid sampling, fluid pumping, fluid diversion, fluid recovery, fluid injection, fluid circulation, fluid measurement fluid metering, artificial lift, gas lift, and/or well scale squeeze operations.

22. The method according to claim 20, wherein the mechanical intervention operations is at least one of a cleaning operation and a pigging operation.

23. The method according to claim 17, wherein the method comprises performing fluid intervention or mechanical intervention operations on a flow system via at least one of the first access interface or the second access interface.

24. The method according to claim 15, wherein the method comprises performing fluid intervention or mechanical intervention operations on a flow system via the first access interface.

\* \* \* \* \*